United States Patent [19]

Landat

[11] Patent Number: 4,991,798
[45] Date of Patent: Feb. 12, 1991

[54] APPARATUS FOR FILLING CRYOGENIC ENGINES OF A LAUNCHER WITH AUTOMATIC SEPARATION ON LIFT-OFF

[75] Inventor: Jacques Landat, Oinville, France

[73] Assignee: Aerospatiale Societe Nationale Industrielle, Paris Cedex, France

[21] Appl. No.: 435,354

[22] Filed: Nov. 13, 1989

[30] Foreign Application Priority Data

Nov. 29, 1988 [FR] France .................. 88 15580

[51] Int. Cl.⁵ .................. B64D 37/00; B64G 1/22; F41F 3/04; F41F 3/55
[52] U.S. Cl. .................. 244/135 R; 244/63; 244/158 R; 102/377; 89/1.811
[58] Field of Search .......... 244/63, 135 R, 158 R, 244/172; 102/377, 378; 89/1.811; 285/2, 4

[56] References Cited

U.S. PATENT DOCUMENTS

| | | | |
|---|---|---|---|
| 1,957,805 | 5/1934 | Rich | 285/2 |
| 3,860,025 | 1/1975 | Nelson | 285/4 |
| 4,059,288 | 11/1977 | Mohr | 285/2 |
| 4,323,094 | 4/1982 | Paulis et al. | 285/4 |
| 4,361,165 | 11/1982 | Flory | 285/2 |
| 4,614,201 | 9/1986 | King et al. | 285/2 |

FOREIGN PATENT DOCUMENTS 1217162 5/1966 Fed. Rep. of Germany .
8705099 9/1987 Fed. Rep. of Germany .

OTHER PUBLICATIONS

WO 8601577, Sunstrand Corp., "Lubricant Delivering Coupling", Miller, Pat. 3/86.

Primary Examiner—Joseph F. Peters, Jr.
Assistant Examiner—L. Palomar
Attorney, Agent, or Firm—Pearne, Gordon, McCoy & Granger

[57] ABSTRACT

In order to fill the cryogenic engines of a launcher with propellents up to the time of launcher lift-off, an apparatus is proposed which has a tube section (20) connecting pipes on the ground and on board the launcher (12). A weakened zone (22) of said tube section is automatically broken during lift-off by a mechanism (24,38) applying a tensile stress to the section. This mechanism comprises several assemblies of links (26,28) bearing on the tube section on either side of the weakened zone and a bearing surface (38a,38b) formed in a sleeve (38) fixed with respect to the ground and with which is in contact a protuberance (26a) formed on one of the links of each assembly (26,28).

11 Claims, 2 Drawing Sheets

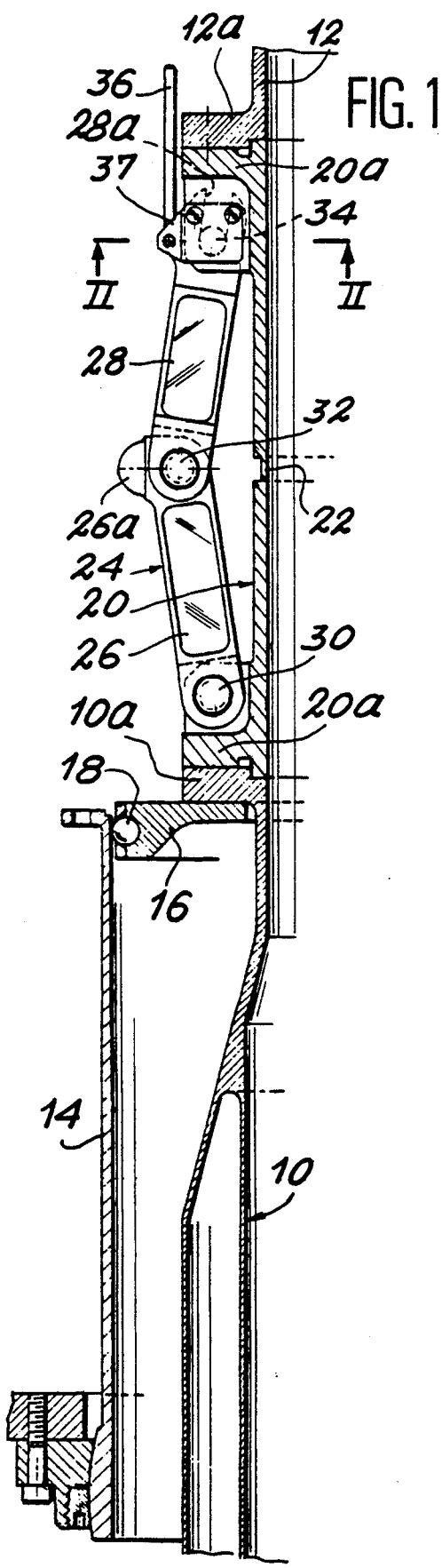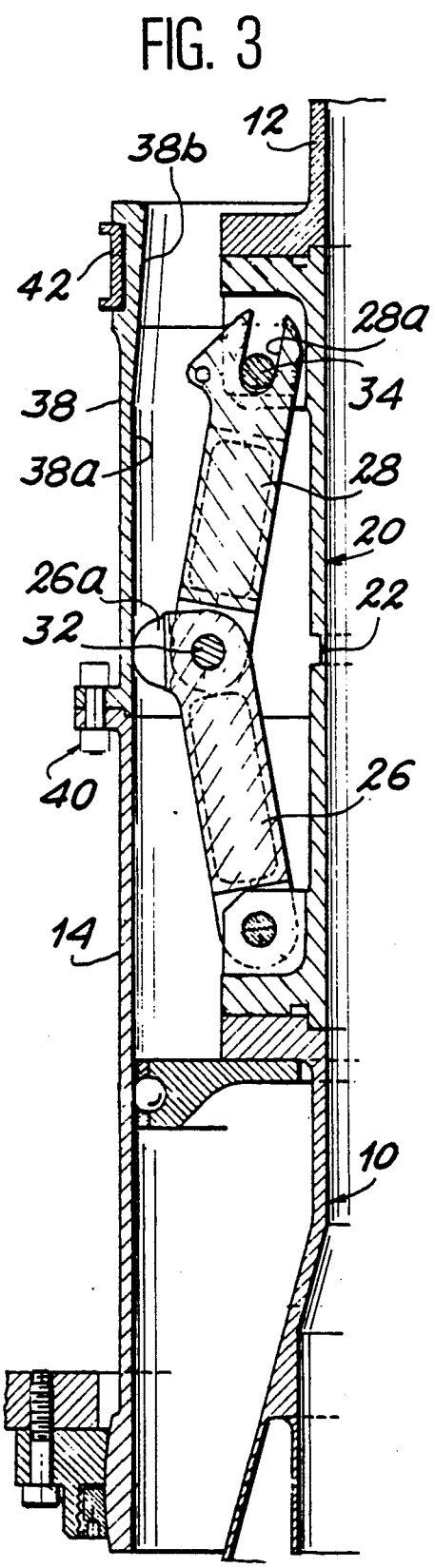

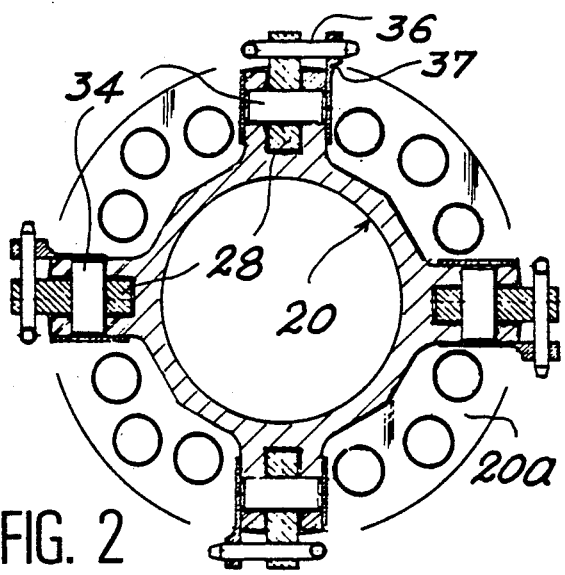
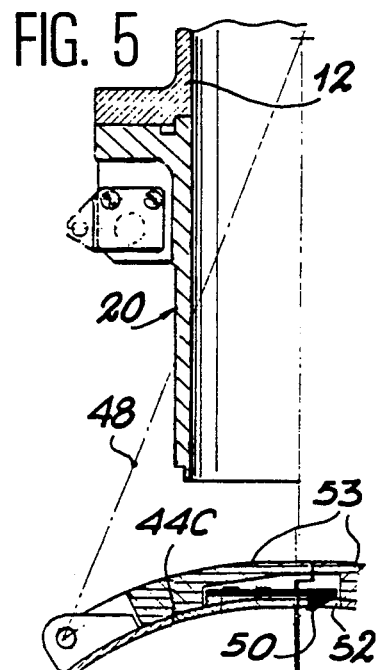
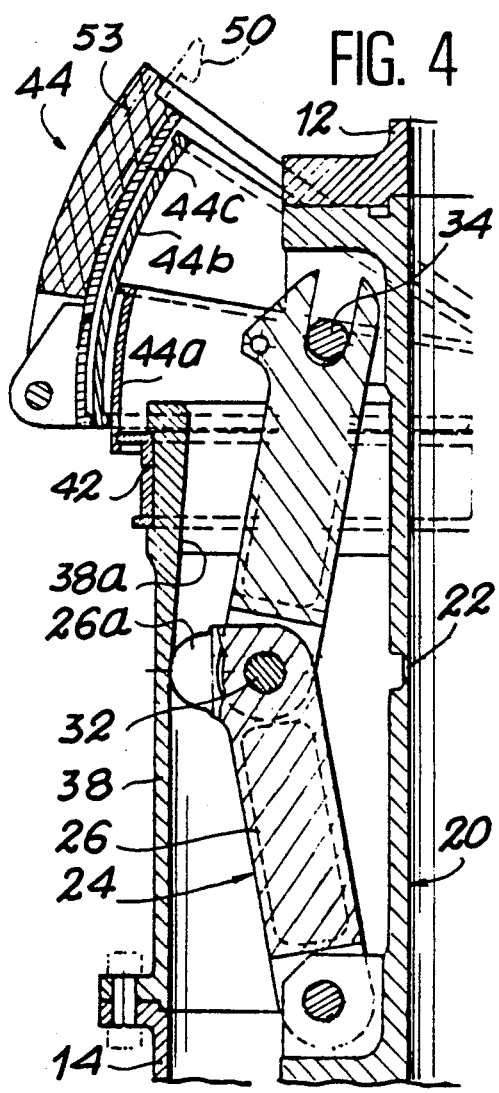
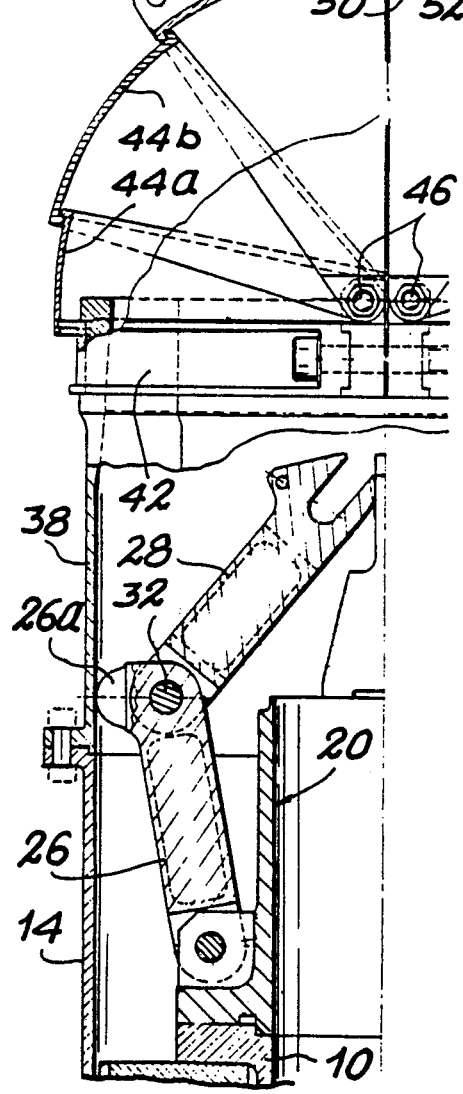

APPARATUS FOR FILLING CRYOGENIC ENGINES OF A LAUNCHER WITH AUTOMATIC SEPARATION ON LIFT-OFF

DESCRIPTION

The invention relates to an apparatus making it possible to fill with propellents cryogenic engines or motors of a launcher and making it possible to separate or fracture the filling pipe system at the time of lift-off or launch.

The filling of the cryogenic stage of a launcher must be carried out just prior to launch. It is particularly important that filling continues up to the time of launch. This requirement leads to significant technical problems, because the fracture of the pipe connecting the ground to the launcher must take place precisely at the instant of launch and without any consequence on the trajectory of the launcher or the ground installations and those on board the launcher.

The known methods for filling cryogenic engines can be placed in two categories, as a function of whether filling takes place through the front part or the rear part of the engines.

In the first category, i.e. when filling takes place through the front part of the engines, it is standard practice to use arms, called cryogenic arms and which have valve-equipped plates. However, the release of these arms at the time of launch is always a difficult operation. If the arm is released too late, although it may not unbalance the launcher, it may at least tear away the filling device, thus creating significant damage to the installations on both the ground and the launcher. Therefore, the method consisting of filling cryogenic engines by the rear is generally preferred.

Among the existing apparatuses using this second procedure, reference is more particularly made to a joint-equipped apparatus, in which sealing is provided by means of a joint located between the propellent supply nozzle and the plate on board the launcher and level with the engine filling pipe. This apparatus is equipped with a ball-operated mechanical locking system which, apart from an initial unlocking system, requires an emergency or standby system. Thus, this known filling apparatus is very complex, requires a very precise mechanism and is therefore very onerous. Moreover, the reliability of said apparatus, evaluated as $10^{-5}$, is incompatible with the reliability required for existing launchers, which is in fact $10^{31}\ 8$.

In connection with supplying cryogenic engines from the rear, the invention relates to a novel filling apparatus, which has a much simpler design and which is consequently much more reliable than the known apparatuses and whose costs are greatly reduced compared with the latter.

The invention therefore specifically relates to an apparatus for filling cryogenic propellents into a launcher, with automatic separation at the time of launch of the latter, characterized in that it comprises a filling tube having a weakened zone and a mechanism bearing on the filling tube on either side of the weakened zone, said mechanism being sensitive to a displacement of the launcher on moving away from the ground in order to automatically apply to the tube a tensile stress leading to its fracture in the weakened zone during the lift-off of the launcher.

According to a preferred embodiment of the invention, the mechanism comprises a system of struts articulated to the filling tube on either side of the weakened zone and a bearing surface fixed with respect to the ground and on which bears the strut system, said surface being such that a displacement of the filling tube caused by the lift-off of the launcher has the effect of applying said tensile stress to the tube via the strut system.

More specifically, the strut system comprises at least three assemblies regularly distributed about the filling tube, each of these assemblies having two links, whereof two adjacent ends are articulated to one another about a common hinge pin and whose opposite ends bear on anchoring pins connected to the tube on either side of the weakened zone, the common hinge pin of each assembly of links being normally further from the filling tube than the anchoring pins, so that at least one of the links is in contact with said bearing surface in the vicinity of said common hinge pin.

In this preferred embodiment, the fixed bearing surface is formed within a sleeve arranged coaxially around the filling tube and fixed to a structure which is stationary with respect to the ground, the fixed bearing surface advantageously being a truncated cone-shaped surface, whose relatively small and large diameter ends are respectively turned towards the ground and towards the launcher.

A preferred embodiment of the invention is described in greater detail hereinafter with reference to the attached drawings, wherein show;

FIG. 1 a longitudinal sectional view illustrating a first stage of fitting a filling tube having a weakened zone according to the invention, during the connection of propellent supply pipes to the cryogenic engines of a launcher.

FIG. 2 a sectional view along line II—II of FIG. 1.

FIG. 3 a longitudinal sectional view comparable to FIG. 1 illustrating, during a following launch preparation stage for a launcher, the fitting of the sleeve surrounding the filling tube of the apparatus according to the invention.

FIG. 4 a longitudinal sectional view comparable to FIGS. 1 and 3 illustrating the following preparation stage of the apparatus, during which the flap-equipped blanking cap or cover is fitted at the end of the sleeve.

FIG. 5 a longitudinal sectional view of the position occupied by the different parts of the filling apparatus according to the invention just prior to launcher lift-off.

In FIG. 1, references 10 and 12 respectively designate the facing ends of a pipe on the ground and a pipe on board the launcher for supplying propellents to the cryogenic engines thereof, these pipes 10 and 12 are located along the same vertical axis and each of their adjacent ends has a flange respectively designated 10a and 12a in FIG. 1.

The ground pipe 10 is arranged coaxially within a liner 14, which constitutes a stationary structure with respect to the ground and within which the pipe 10 can move axially, the guidance and centering of the upper end of pipe 10 within liner 14 are ensured by a ring 16 fixed to flange 10a and whose outer periphery has recesses in which are trapped balls 18 rolling on the inner surface of liner 14. In the launch preparation position illustrated in FIG. 1, the flange 10a formed at the upper end of pipe 10 is flush with the upper end of liner 14. Under these conditions, part of the filling apparatus according to the invention can be located between the flanges 10a and 12a.

This first part of the filling apparatus according to the invention comprises a tube section 20 having a weakened zone 22 and a strut system 24 articulated to the tube section 20 on either side of said weakened zone.

More specifically, the tube section 20 has at each of its ends a flange 20a which can be tightly fixed to the flanges 12a and 10a by any appropriate fixing means, such as not shown bolts. The internal diameter of the tube section 20 is equal to the internal diameter of the adjacent parts of pipes 10 and 12. The weakened zone 22, which is located in the centre of tube section 20, is constituted by a thinner zone obtained by making an annular groove over the outer surface of the section.

Moreover, the strut system 24 comprises four assemblies, each constituted by two links 26 and 28. These assemblies are regularly distributed around the tube section 20 at 90° from one another and as illustrated in FIG. 2. It should be noted that the number of assemblies of two links 26 and 28 can differ from four, provided that said number is at least equal to three, in order to ensure a good distribution of the axial forces exerted on the tube section 20 during lift-off.

As can be seen from FIG. 1, each of the links 26 is articulated to the tube section 20 by an anchoring pin 30 orthogonal to the axis of the tube section and simultaneously traversing a yoke formed at the lower end of link 26 and a radial rib covered by said link and formed on the tube section immediately above the lower flange 20a.

The opposite end of link 26 is hinged by a hinge pin 32 to the lower end of link 28. To this end, the planar upper end of link 26 penetrates a yoke formed at the lower end of the link 28 corresponding thereto. At its upper end, each of the links 28 has an open longitudinal slot 28a giving it the shape of a fork, which overlaps an anchoring pin 34 traversing both the slot 28a and a yoke formed on the upper end of the tube section 20 immediately below the upper flange 20a.

When the link assemblies 26 and 28 occupy a waiting position in which the bottom of the slots 28a bears on the anchoring pins 34, hinge pin 32 is slightly further from the axis of the tube section 20 than anchoring pins 30 and 34. In other words, the two links 26 and 28 are folded slightly outwards, in such a way that the application of a force radially oriented towards the inside to each of the link assemblies 26 and 28 level with the hinge pin 32 has the effect of moving the upper end of link 28 away from the lower end of link 26.

As is also shown in FIG. 1, each of the links 26 has at its upper end and on its outer edge with respect to the tube section 20 a semicircular protuberance 26a, whose function will become apparent hereinafter.

In the position illustrated in FIGS. 1 and 2, which corresponds to the fitting of the tube section 20 carrying the strut system 26 between pipes 10 and 12, a locking mechanism is provided between the upper end of each of the links 28 and the upper end of the tube section 20 in order to ensure that each of the pairs of links 26 and 28 cannot escape from the hinge pin 34.

In the embodiment shown, this locking mechanism is constituted by a retaining pin 36 for each of the link pairs. More specifically, each of the retaining pins 36 simultaneously traverses a hole formed in the upper end of the link 28 and a hole formed in a plate 37, e.g. fixed by screws to the yoke formed at this point on the tube section 20 and as shown in FIG. 2.

When the assembly formed by the tube section 20 and the strut system 24 is mounted between pipes 10 and 12, the latter together with the tube section 20 linking them are lowered by a predetermined distance, in order to bring the protuberances 26a just above the upper end of the liner 14 and as illustrated in FIG. 3. Under these conditions, another element of the apparatus according to the invention is put into place. This element is constituted by a sleeve 38, which is coaxially fixed in the extension of liner 14, e.g. by means of bolts 40 traversing adjacent flanges respectively formed on the liner and on the sleeve. In order to permit its fitting, the sleeve 38 is made in the form of two half-sleeves having a semicircular cross-section and held against one another at their upper ends by a collar 42.

The inner surface of sleeve 38 defines a fixed bearing surface with respect to the ground and on which can slide the protuberances 26a formed on each of the lower links 26. In its lower part, said bearing surface has a cylindrical portion 38a, whose diameter is identical to the internal diameter of liner 14. When sleeve 38 is put into place, the protuberances 26a are in contact with the lower part of said cylindrical portion 38a of the bearing surface, in such a way that each assembly of links 26 and 28 is maintained in the slightly outwardly bent waiting position defined hereinbefore with reference to FIG. 1. Thus, pins 36 can be dismantled.

In its upper part, the bearing surface formed within the sleeve 38 has a truncated cone-shaped portion 38b, whose diameter decreases from bottom to top starting from the cylindrical portion 38a.

When the fitting of sleeve 38 is ended, the assembly formed by pipes 10 and 12 and the tube section 20 connecting them is raised within the liner 14 and sleeve 38 up to a position illustrated in FIG. 4., where the protuberances 26a are located precisely at the junction between the cylindrical 38a and truncated cone-shaped 38b portions of the bearing surface formed within sleeve 38. This position defines the waiting position in which the different parts are located just prior to the launch of the launcher.

In this position and as illustrated in FIG. 4, at the upper end of the sleeve 38 is fitted a blanking cap or cover 44 constituted by several flaps 44a,44b,44c hinged to the sleeve 38 about two pins 46 (FIG. 5) close to the vertical axis common to the sleeve and to the tube section 20.

More precisely, the blanking cap 44 is formed by two rows of three flaps 44a,44b,44c which, when opened out in the manner illustrated in FIG. 5, have a hemispherical shape. The two flaps 44a are fixed to the ring 42 surrounding the upper end of sleeve 38, whilst the two flaps 44c are connected to a not shown anchoring part of the launcher by connecting cables diagrammatically represented at 48 in FIG. 5 and able to break at the time of lift-off. The adjacent flaps 44a,44b and 44c are provided with folded ledges, which can bear against one another in order to ensure the complete opening out of the blanking cap (FIG. 5) when the flaps 44c are drawn upwards by the cables 48 at the time of lift-off.

The upper edges of the flaps 44c are respectively provided with a latch 50 and a notch 52 constituting a lock ensuring the automatic closure of the blanking cap 44 in the opened out position. In addition, the upper flaps 44c are externally equipped with a heat insulation 53 protecting the propellent feed pipe 10 at the time of launch.

Under these conditions, at the time of launcher lift-off, the assembly formed by pipes 10 and 12 and by the pipe section 20 interconnecting them is moved upwards with the launcher, which has the effect of making the protuberances 26a slide along the truncated cone-shaped portion 38a of the bearing surface formed within sleeve 38, which remains stationary with respect to the ground. A radially inwardly oriented force is thus applied at the hinge pins 32 on each of the pairs of links 26 and 28. This force increases the distance separating the ends of the links, so that a tensile force is exerted by each of the link pairs on the tube section 20 between the hinge pins 30 and 34. Under the effect of this force, the weakened zone 22 of the tube section 20 breaks, so that the upper portion of the tube section 20 fixed to the launcher pipe 12 is separated from the lower part of said tube section fixed to the ground pipe 10 and on which remain articulated the link pairs 26 and 28. This situation is shown in FIG. 5.

Simultaneously, the connecting members 48 connecting the launcher to the blanking cap 44 automatically control the opening of the latter, which is locked in said position by lock 50,52.

As a result of the automatically separating filling apparatus described hereinbefore with reference to FIGS. 1 to 5, the propellent filling of cryogenic engines of a launcher can be carried out through pipes 10 and 12 in a tight manner by tube section 20 up to the time of launcher lift-off. The use of a filling tube having a weakened zone makes it possible to control the automatic breaking of said zone at the time of lift-off by entirely mechanical and particularly simple means formed in the preferred embodiment by the strut system 24 associated with the fixed bearing surface formed within the sleeve 38 surrounding said system.

The above description also shows that the apparatus according to the invention has limited overall dimensions and that it can be simply installed without any need for great accuracy, because the truncated cone-shaped surface 38 makes it possible to take up all play possibly existing between the pairs of links and the sleeve prior to launch.

Moreover, it is important to observe that the tear-off force which must be applied to the tube is relatively small, which obviates damage to the ground installations or to the launcher. Finally, the reliability of this apparatus is greater than that of known apparatuses and complies with existing requirements for launchers, which require a reliability of $10^{-8}$. Moreover, the existence of the flapped blanking cap 44 makes it possible to automatically close and protect the ground propellent feed pipe at the time of launch.

Obviously, the invention is not limited to the embodiment described in exemplified manner hereinbefore and covers all variants thereof. It is clear that the strut system associated with the fixed bearing surface formed within the sleeve 38 can be replaced by any equivalent mechanism making it possible to automatically exert a tensile stress between the opposite ends of the tube section enabling the automatic fracture of the latter at the weakened zone during launcher lift-off. Moreover, in the case where an articulated strut system of the aforementioned type is used, the sleeve 38 can be replaced by multiple bearing parts positioned facing each of the pairs of links.

I claim:

1. Apparatus for filling cryogenic propellents into a launcher, with automatic separation at the time of launch of the latter, characterized in that it comprises a filling tube having a weakened zone and a mechanism bearing on the filling tube on either side of the weakened zone, said mechanism being sensitive to a displacement of the launcher on moving away from the ground in order to automatically apply to the tube a tensile stress leading to its fracture in the weakened zone during the lift-off of the launcher.

2. Apparatus according to claim 1, wherein the mechanism comprises a system of struts articulated to the filling tube on either side of the weakened zone and a bearing surface fixed with respect to the ground and on which bears the strut system, said surface being such that a displacement of the filling tube caused by the lift-off of the launcher has the effect of applying said tensile stress to the tube via the strut system.

3. Apparatus according to claim 2, wherein the strut system comprises at least three assemblies regularly distributed about the filling tube, each of these assemblies having two links, whereof two adjacent ends are articulated to one another about a common hinge pin and whose opposite ends bear on anchoring pins connected to the tube on either side of the weakened zone, the common hinge pin of each assembly of links being normally further from the filling tube than the anchoring pins, so that at least one of the links is in contact with said bearing surface in the vicinity of said common hinge pin.

4. Apparatus according to claim 3, wherein one of the links of each assembly is mounted in pivoting manner on a first of the hinge pins and the other link has at its opposite end an open longitudinal slot in which the second hinge pin is received.

5. Apparatus according to claim 3, wherein the first and second hinge pins are connected to the filling tube respectively on the ground side and on the launcher side with respect to the weakened area.

6. Apparatus according to claim 2, wherein the fixed bearing surface is formed within a sleeve arranged coaxially around the filling tube and fixed to a structure stationary with respect to the ground.

7. Apparatus according to claim 6, wherein the fixed bearing surface has a truncated cone-shaped surface, whose relatively small and large diameter ends are turned respectively towards the ground and towards the launcher.

8. Apparatus according to claim 6, wherein the sleeve end turned towards the launcher supports a blanking cap able to automatically close the sleeve and part of the filling tube remaining on the ground at the time of launcher lift-off.

9. Apparatus according to claim 8, wherein the blanking cap is formed from flaps which can be opened out and which are provided with a lock for automatic closure in the opened out position, the opening out of the flaps being controlled by connecting members fixed to the launcher and to said flaps and which break automatically during lift-off.

10. Apparatus according to claim 1, wherein the filling tube is a tube section terminated by flanges making it possible to tightly fix said section respectively to a ground pipe and to a launcher-linked pipe.

11. Apparatus according to claim 10, wherein the weakened zone is a zone of reduced thickness in the centre of the tube section.

* * * * *